United States Patent
Walker et al.

(10) Patent No.: US 7,137,335 B2
(45) Date of Patent: Nov. 21, 2006

(54) PLASTICS WASTE PROCESSOR

(75) Inventors: Steven C. Walker, Pittsburgh, PA (US); David J. Niedoba, Greensburg, PA (US); Gary L. Alexander, Hagerstown, MD (US); Carlton W. Jones, Upper Marlboro, MD (US); Thomas V. Walters, Glen Burnie, MD (US); Christian R. Adamoyurka, Langhorne, PA (US); Paul J. Schwegler, Philadelphia, PA (US); Steven S. Marx, Havertown, PA (US); Whitfield T. Reddin, Woodbury, NJ (US); Joseph B. Lynch, Havertown, PA (US)

(73) Assignee: SAIC, Inc.

( * ) Notice: Subject to any disclaimer, the term of this patent is extended or adjusted under 35 U.S.C. 154(b) by 21 days.

(21) Appl. No.: 11/053,769

(22) Filed: Feb. 9, 2005

(65) Prior Publication Data

US 2006/0174782 A1    Aug. 10, 2006

(51) Int. Cl.
*B30B 15/34* (2006.01)

(52) U.S. Cl. .................. 100/92; 100/245; 100/250; 100/269.01; 100/316; 100/319; 100/326; 425/407; 425/416

(58) Field of Classification Search ................ 100/92, 100/245, 250, 269.01, 269.14, 305, 315, 100/316, 317, 318, 319, 320, 324, 326; 425/384, 425/407, 416, DIG. 46; 72/342.8, 342.92
See application file for complete search history.

(56) References Cited

U.S. PATENT DOCUMENTS

| | | | | |
|---|---|---|---|---|
| 5,411,697 A | * | 5/1995 | McGraw et al. | 264/294 |
| 5,489,200 A | * | 2/1996 | McGraw et al. | 425/144 |
| 5,578,159 A | * | 11/1996 | Miyashita et al. | 156/358 |
| 5,740,725 A | * | 4/1998 | Tomizawa et al. | 100/92 |
| 5,832,818 A | * | 11/1998 | Menzak, Jr. | 100/92 |

* cited by examiner

*Primary Examiner*—Lowell A. Larson
*Assistant Examiner*—Jimmy T. Nguyen
(74) *Attorney, Agent, or Firm*—Townsend & Banta

(57) ABSTRACT

A plastics waste processor is provided for efficiently compacting and melting plastics waste, so as to form easily disposable compact plastic units having a volume considerably smaller than the unprocessed plastics waste. The plastics waste processor has a waste containment chamber, a rotating chamber door, a jam breaker bar to facilitate opening of the door when jammed by melted plastic waste, pneumatically driven waste compaction means with plastic shedding rams, a waste containment chamber heating system, a processor temperature monitoring means, a cooling means, and a control means. Further a cable and hose management system is provided for protection of moving cables and hoses, as well as a washdown system for automatic cleaning of the processor.

13 Claims, 14 Drawing Sheets

PLASTICS WASTE PROCESSOR

The invention described herein may be manufactured and used by or for the Government of the United States of America for governmental purposes without the payment of any royalties thereon or therefore.

FIELD OF THE INVENTION

The present invention provides a plastics waste processor for efficiently compacting and melting plastics waste, so as to form easily disposable compact plastic units having a volume considerably smaller than the unprocessed plastics waste. More particularly, the present invention relates to an apparatus for processing plastic waste which is contaminated with, for example, food, paper, and metal, into densified blocks or slugs suitable for long-term, sanitary storage, in order to reduce the volume of such waste, the corresponding storage space associated therewith and overcome cleanliness issues encountered with conventional plastics waste storage and disposal.

BACKGROUND OF THE INVENTION

Navy ships generate plastic waste at a rate of approximately 0.2 pounds per man per day. This plastic waste has very low density, approximately 1.4 pounds per cubic foot, and approximately 60% of this waste is heavily contaminated with food residue. Historically, all of this plastic waste was mixed with the remainder of the ship's waste and discharged at sea. This method of disposal, however, is no longer used due to its negative environmental impact.

A less environmentally harmful procedure now carried out involves compacting the onboard plastic waste, and storing the compacted waste for disposal upon reaching shore, using a conventional compress/melt waste processor. Such a conventional compress/melt waste processor, as disclosed in U.S. Pat. Nos. 5,411,697 and 5,489,200, to McGraw, et al., compacts the plastic waste inside of a compaction chamber having a hatch door thereon, and heats the compacted waste to a target temperature of approximately 325°–350° F. by cycling resistance heaters until the temperature at the center of the slug (compressed plastic waste) exceeds the boiling point of water. During this processing cycle, the ram continues to maintain the target compaction force. At the end of the process cycle, the control system turns off the electrical resistance heaters and begins cooling the processor.

When the processor reaches a predetermined cooled temperature, the control system stops the cooling process, the ram is retracted far enough to relieve the compaction pressure, and the hatch door is released from the frame by rotating the door about its axis to release a breech lock mechanism. The hatch door is rotated about its hinge axis to open the end of the chamber and the ram is extended to push the completed slug out of the chamber for removal and storage.

However, it was found that the above conventional compress/melt waste processor disclosed in the McGraw, et al. references suffers from various operational and maintenance deficiencies, such as unacceptably long compaction periods, jamming of the compaction ram due to melted plastic wedging between the ram and the chamber walls, jamming of the hatch door when rotating on its axis to free the breech lock at the end of the process cycle, contamination of the machine surfaces due to excessive build-up of food waste, failures of cable and hose under the ram due to poor cable and hose management, failures of non-robust temperature sensors, difficulty troubleshooting because of an overly complex control system, and performance of excessive scheduled maintenance.

In view of the above deficiencies of the conventional processes for plastic waste processing, it is an object of the present invention to provide a plastic waste processor capable of efficiently compacting plastic waste, while also being reliable in terms of operability. In particular, it is an object of the invention to provide a plastics waste processor having a pneumatic compacting means capable of avoiding jamming and sudden release problems encountered with the conventional processors. It is a further object of the present invention to provide a plastics waste processor having a waste containment chamber door capable of being easily and safely opened after processing of plastic waste.

It is yet a further object of the present invention to provide a plastics waste processor having a compaction ram capable of overcoming jamming problems associated with the conventional processors. Further, it is an object of the present invention to provide a plastics waste processor having a washdown system for easy cleaning of the processor after processing, as well as an improved system for efficiently maintaining and protecting moving cable and hoses within the device during processing.

SUMMARY OF THE INVENTION

In order to achieve the objects of the invention, in a first embodiment of the present invention, a plastics waste processor comprising:
  a base;
  a frame having a top end, and a bottom end attached to said base;
  a hinge arm assembly movably attached to the frame comprising a hinge fixed to said frame, and a handle portion attached to said hinge;
  a waste containment chamber attached to said frame, said waste containment chamber comprising a waste chamber having a chamber entrance port therein, said chamber entrance port defining a chamber entrance port outer circumference, and a breech-lock door assembly rotatably attached to said hinge arm and adjacent to said chamber entrance port;
  two or more receptor blocks affixed to the frame, and positioned adjacent to the outer circumference of the waste containment chamber entrance port;
  a pneumatically driven waste compaction means interactively adjacent to said waste containment means, said pneumatically driven waste compaction means comprising:
    (i) a pneumatic drive means attached to said base;
    (ii) a pneumatically driven ram in movable connection with said pneumatic drive means, so as to be capable of compressing/compacting waste located within said waste containment means; and
    (iii) one or more dampers positioned between the pneumatically driven ram and the base, and parallel to the pneumatically driven ram;
  a waste containment chamber heating means integral with or adjacent to the breech lock door assembly and the pneumatically driven waste compaction means;
  a processor temperature monitoring means comprising one or more thermostats located adjacent to one or more components of the plastics waste processor for monitoring a temperature of the processor during operation;
  a cooling means in conductive connection with said processor temperature monitoring means and adjacent to the waste containment means and the pneumatically driven waste compaction means so as to be capable of cooling same, said cooling means comprising a fluid circulation means having a first end, a second end and a flow control means, said fluid circulation means flowably connected to a pressurized fluid source, a fluid entrance port flowably connected to the first end of the fluid circulation means, and a fluid exit port flowably connected to the second end of the fluid circulation means; and a user control means conductively connected to one or more of the the waste containment chamber heating means, the pneumatically driven waste compaction means, and the processor temperature monitoring means.

In a second embodiment, the plastics waste processor of the first embodiment above is provided, further comprising:

a power source in conductive connection with the waste containment chamber heating means, the pneumatically driven waste compaction means, processor temperature monitoring means, and the cooling means.

In a third embodiment of the present invention, the plastics waste processor of the first embodiment above is provided, wherein said breech lock door assembly is comprised of:

a waste containment chamber door adjacent to and in rotatable communication with the chamber entrance port, and attached to the handle portion of the hinge arm assembly, said waste containment chamber door having:

a rotary bearing disposed on a central axis, for rotatable engagement with the hinge arm;

an outer circumference equal to or larger than the chamber entrance port outer circumference;

two or more pivoting lugs attached to the outer circumference of the waste containment chamber door, so as to be capable of rotatable interaction with the receptor blocks;

one or more release blocks attached to said pivoting lugs;

a linear actuating means having a first end fixably attached to the hinge and a second end movably attached to the waste containment chamber door, and positioned so as to be able to rotatably move the waste containment chamber door;

a waste containment chamber door damper means having a first end, a second end, and a damper there between, the first end of the waste containment chamber door damper fixably connected to the hinge, and the second end of the waste containment chamber door damper movably connected to the waste containment chamber door, the damper means positioned so as to oppose rotary motion of the waste containment chamber door;

a jam breaker bar rotatably connected to one or more of said receptor blocks via a pivoting means, so as to be capable of forcible interaction with one or more of said release blocks, said jam breaker bar having a first end defining a handle, a second end defining a release block interaction point, and a midsection having a a pivot point adjacent to the pivoting means;

wherein said jam breaker bar pivots around the pivoting means to exert pressure upon the release block of the waste containment chamber door assembly, so as to cause waste containment chamber door to rotate around the central axis thereof.

In a fourth embodiment of the present invention, the plastics waste processor of the first embodiment above is provided, wherein said waste containment chamber heating means comprises:

a heating device selected from the group consisting of electric resistance heaters, steam heating tubes or hot water heating tubes; and a heating device controller in connection with the heating device.

In a fifth embodiment of the present invention, the plastics waste processor of the first embodiment above is provided, wherein the cooling means is a direct seawater cooling means, and said fluid circulation means is comprised of titanium tubing embedded in the waste containment chamber door and the pneumatically driven ram.

In a sixth embodiment of the present invention, the plastics waste processor of the first embodiment above is provided, wherein the control means comprises a computer controller and a user interface.

In a seventh embodiment of the present invention, the plastics waste processor of the first embodiment above is provided, further comprising:

a cable and hose management system comprising one or more cable carriers having a first end and a second end, the first end of the cable carrier being affixed to the frame and the second end being affixed to the pneumatically driven ram, wherein each cable carrier is comprised of a plurality of connected movable links having a hollow interior portion for containment of cables and/or hoses for encompassing one or more of waste containment chamber heating means cables, pneumatically driven waste compaction means cables and hoses, and processor temperature monitoring means cables.

In an eighth embodiment of the present invention, the plastics waste processor of of the seventh embodiment above is provided, wherein the cable and hose management system further comprises a thermal isolating means having a first end affixed to the pneumatically driven ram and second end affixed to the second end of the cable carrier, so as to thermally isolate the cable carrier from heat generated by the pnuematically driven ram.

In a ninth embodiment of the present invention, the plastics waste processor of the first embodiment above is provided, further comprising a washdown system adjacent to the waste containment chamber and pneumatically driven waste compaction means, said washdown system comprising:

one or more fluid inlet ports;

one or more fluid distribution manifolds in flowable connection with one or more of the fluid inlet ports;

one or more fluid supply tubes having a first end and a second end, the first end of each fluid supply tube flowably connected to one or more of the fluid distribution manifolds;

one or more spray nozzles adjacent to the waste containment chamber and the pneumatically driven ram, and flowably connected to the second end of a fluid supply tube.

In a tenth embodiment of the present invention, the plastics waste processor of the ninth embodiment above is provided, wherein the washdown system further comprises:

one or more detergent solution holding tanks flowably connected to one or more of the fluid inlet ports; and a detergent solution flow control means in flowable connection with the detergent solution holding tank, wherein flow of the detergent solution to one or more of the fluid distribution manifolds from the holding tank may be controlled by the control means.

In an eleventh embodiment of the present invention, the plastics waste processor of the tenth embodiment above is provided, wherein the detergent solution control means is selected from the group consisting of a programmable logic controller, a relay logic controller, or a mechanical logic controller.

In a twelfth embodiment of the present invention, the plastics waste processor of the first embodiment above is provided, wherein the pneumatically driven ram comprises:

a ram compaction face;

a circumferential ram body portion having a top edge adjacent the ram compaction face, a midsection adjacent the top edge, and a bottom edge adjacent the midsection;

relief portions formed into the midsection of the circumferential ram body portion, and extending to the bottom edge thereof, wherein plastic waste extruded past the top edge of the circumferential ram body portion during compaction and processing of plastic waste is allowed to escape from the waste containment chamber via the relief portions.

In a thirteenth embodiment of the present invention, the plastics waste processor of the first embodiment above is provided, wherein the pneumatically driven ram comprises:

a ram compaction head having a face, a circumferential portion adjacent the face, and a base portion portion adjacent the circumferential portion; and three or more guide runners integral with or attached to the base portion of the ram compaction head wherein plastic waste extruded past the circumferential portion of the ram compaction head during compaction and processing of plastic waste is allowed to escape from the waste containment chamber via space between the guide runners.

DETAILED DESCRIPTION OF THE INVENTION

As discussed above, shipboard plastics waste containment and disposal presents various problems, such as storage limitations, environment concerns, etc. To address these problems, the present inventors have endeavored to provide a processor for efficiently compacting and processing plastics waste for storage and later disposal, capable of compacting the plastics waste and heating the plastics waste to a temperature sufficient to melt the low-melting thermoplastic waste, thereby creating an encapsulated plastics waste "slug".

Figure 1:
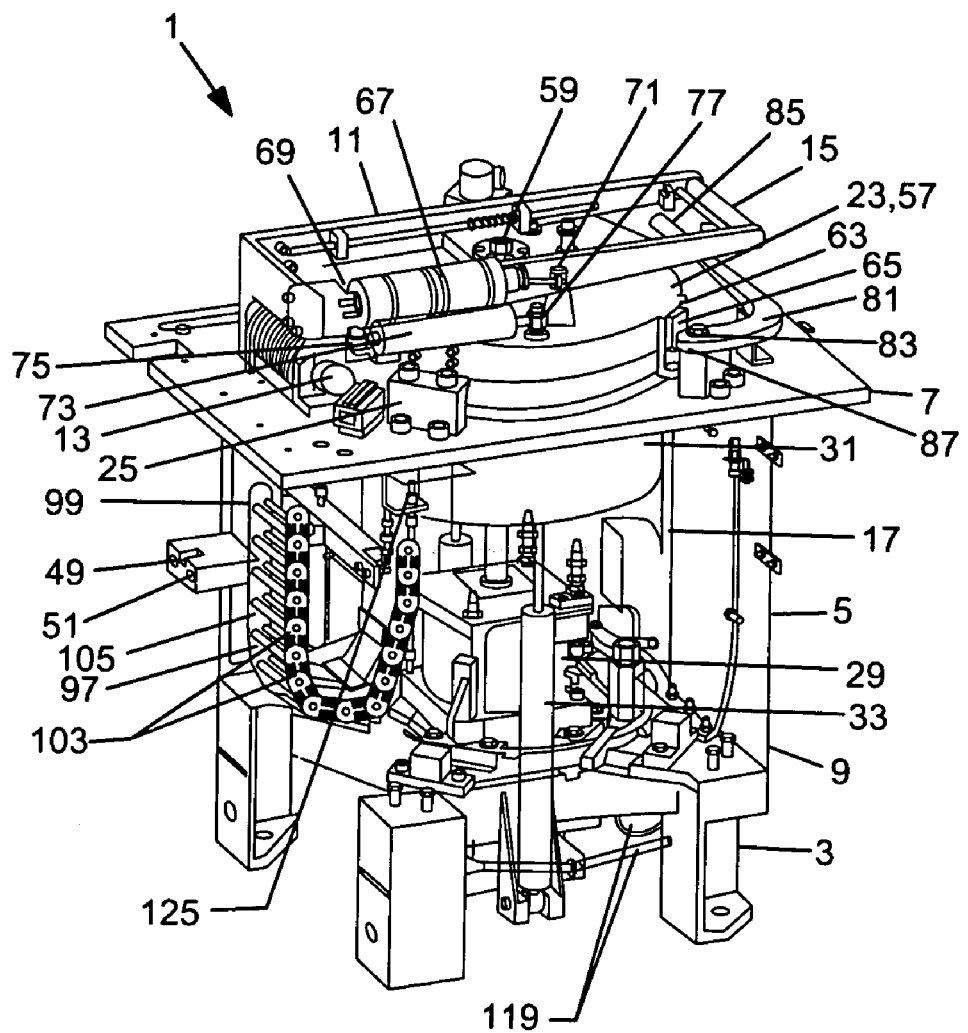
FIG. 1 is a perspective view of the plastic waste processor of the present invention according to the first embodiment.
Figure 2:
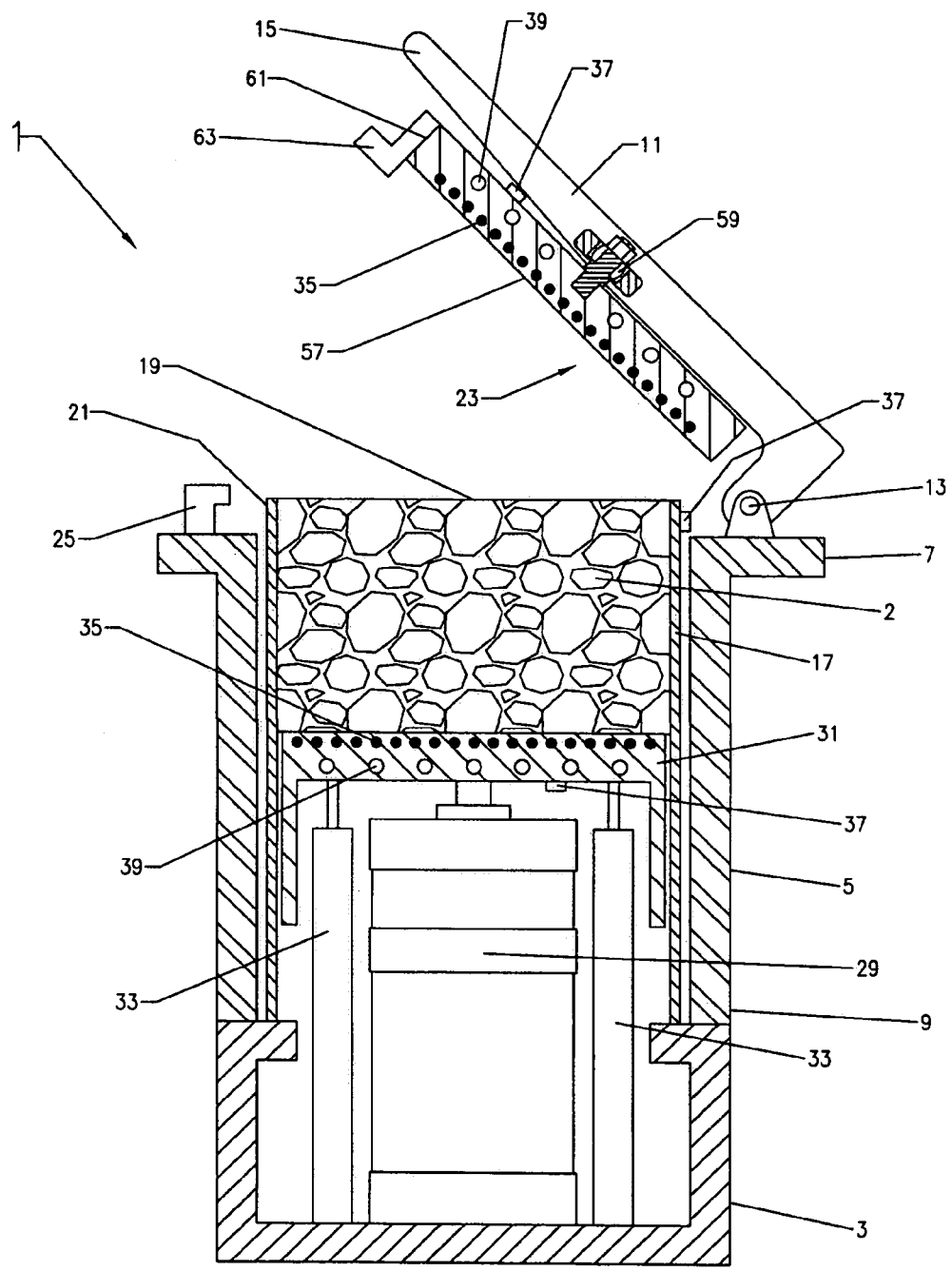
FIG. 2 is partial cross sectional view of the plastic waste processor of the first embodiment of the present invention, illustrating the position of the pneumatically driven waste compaction means fully retracted before the compaction process and with the waste containment chamber door hinged to the open position exposing the chamber entrance port.
Figure 3:
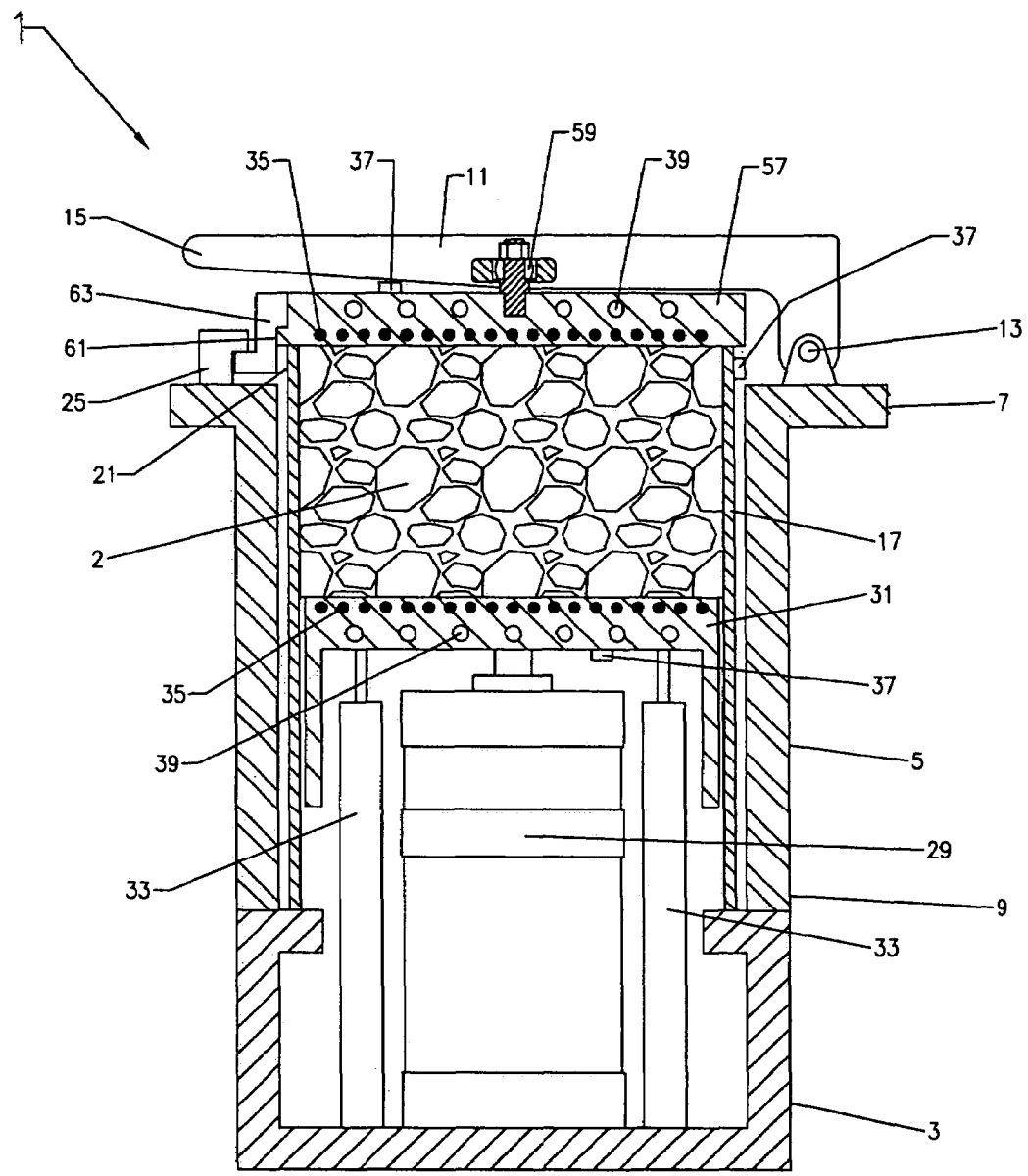
FIG. 3 is partial cross sectional view of the plastic waste processor of the first embodiment of the present invention, illustrating the position of the pneumatically driven waste compaction means fully retracted before the compaction process with the containment chamber door hinged to the closed position and the breech lock engaged.
Figure 4:
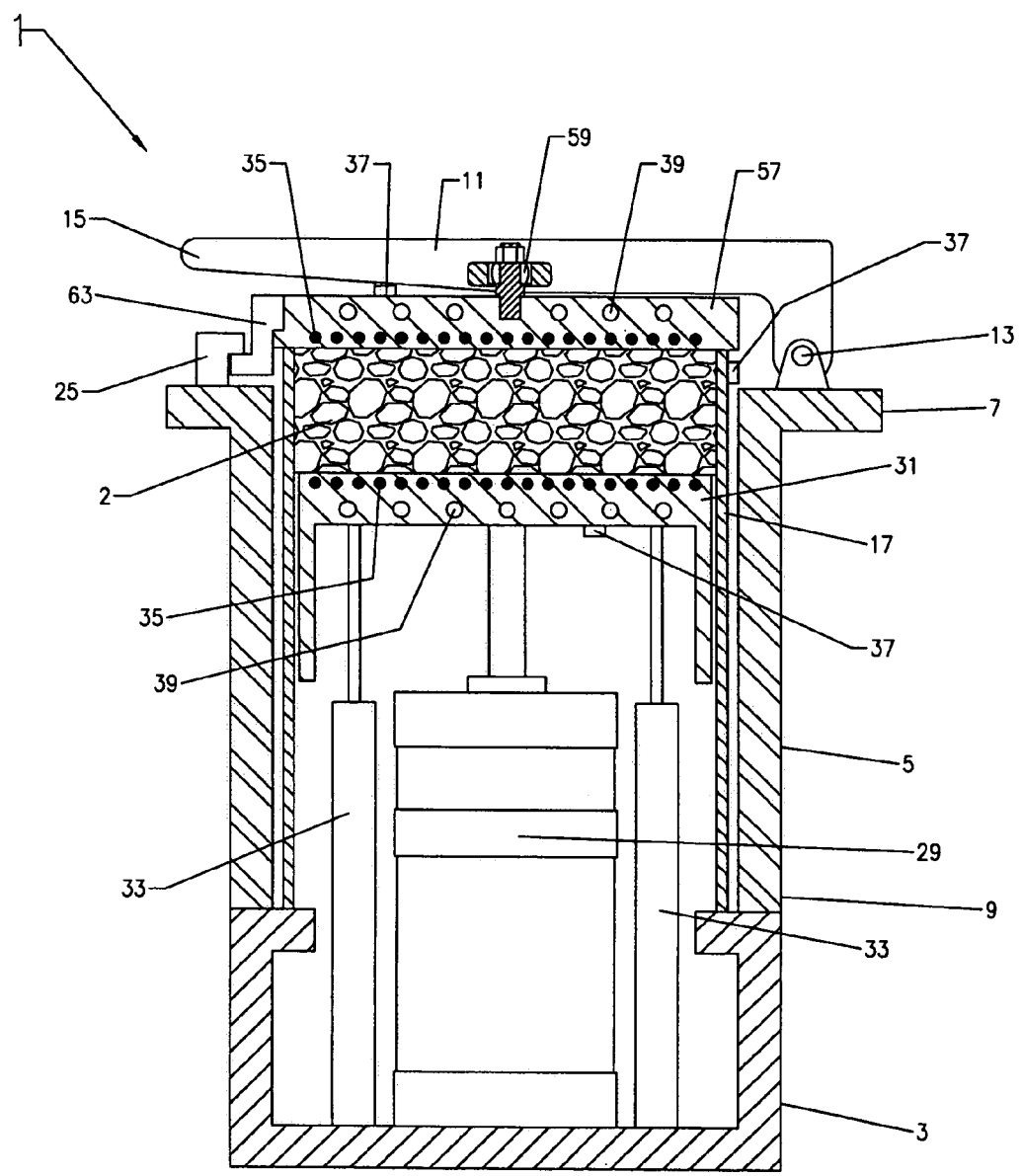
FIG. 4 is partial cross sectional view of the plastic waste processor of the first embodiment of the present invention, illustrating the position of the pneumatically driven waste compaction means during the compaction process.
Figure 5:
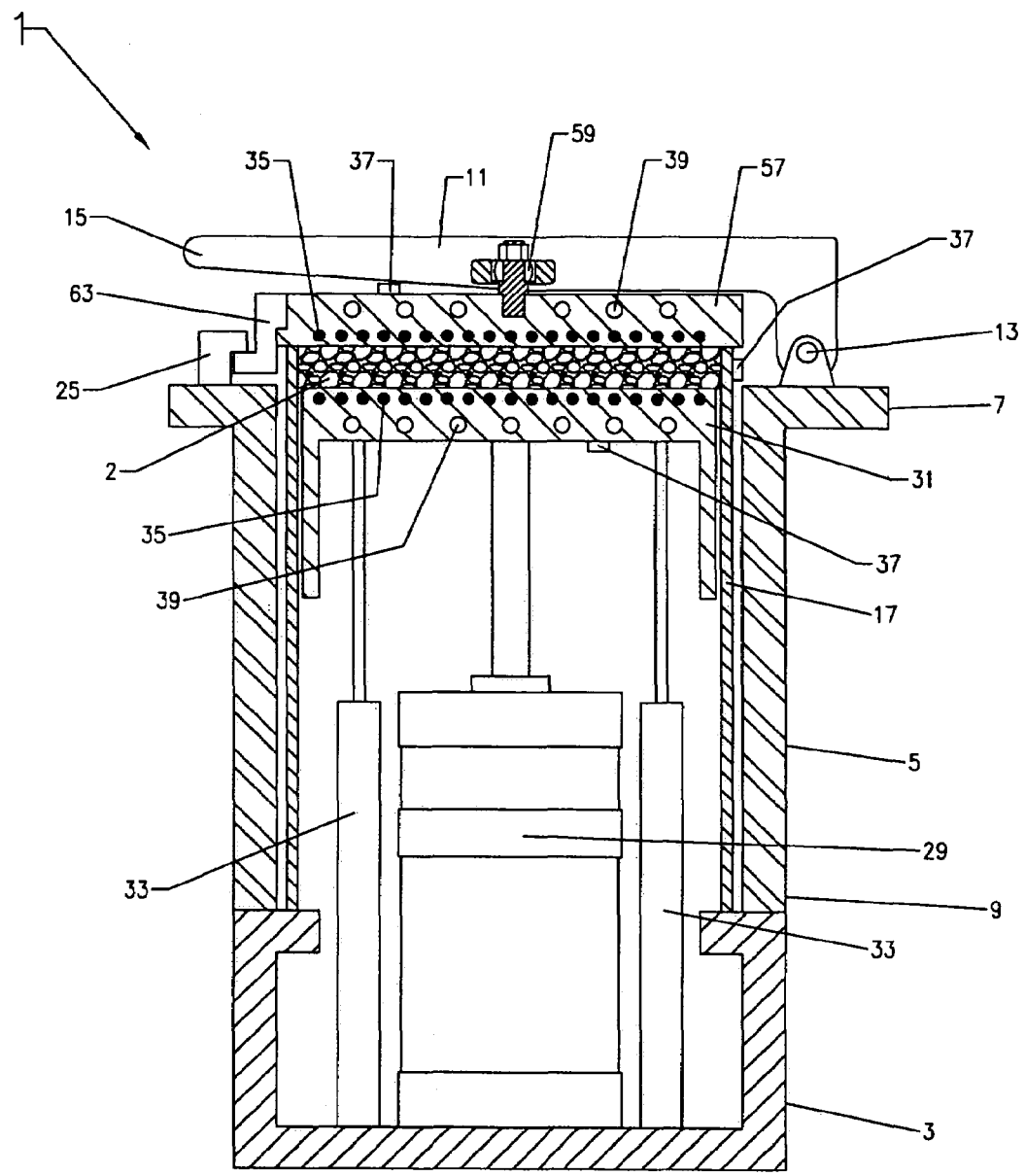
FIG. 5 is partial cross sectional view of the plastic waste processor of the first embodiment of the present invention, illustrating the position of the pneumatically driven waste compaction means at the end of the compaction process, and before the waste chamber containment door is opened.
Figure 6:
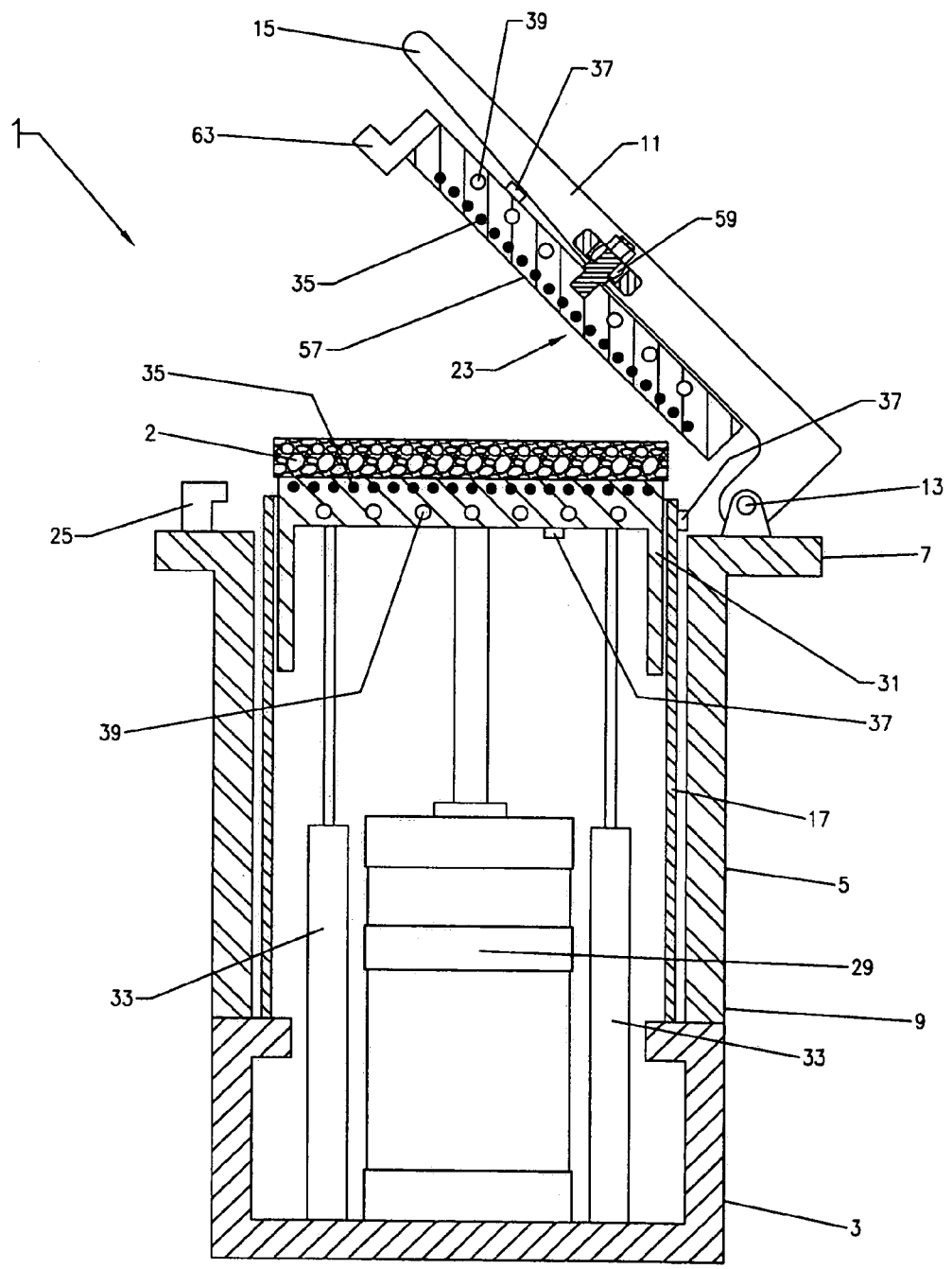
FIG. 6 is partial cross sectional view of the plastic waste processor of the first embodiment of the present invention, illustrating the position of the pneumatically driven waste compaction ram in its fully extended position, wherein the ram compaction face is extended above the top of the chamber entrance port so as to eject the slug (the compressed plastic waste) from the waste containment chamber.

In particular, as illustrated in FIG. 1, a plastics waste processor 1 is provided, having a base 3 and a frame 5, the frame having a top end 7 and a bottom end 9. A waste containment chamber 17 is mounted on/attached said base 3. The waste containment chamber 17, as illustrated in FIG. 2, has a chamber entrance port 19, into which plastics waste is placed for processing. The chamber entrance port 19 has an outer circumference 21.

As illustrated in FIGS. 2–6, a hinge arm assembly 11 having a handle portion 15 is movably attached to the top end 7 of the frame 5 via a hinge 13. A breech lock door assembly 23, consisting of a waste containment chamber door 57 and two or more pivoting lugs 63 attached to the outer circumference 61 of the waste containment chamber door 57, is rotatably attached to the hinge arm assembly 11 via rotary bearing 59, to enable rotatable engagement of the waste containment chamber door with the hinge arm assembly 11. The outer circumference 61 of the waste containment chamber door 57 is as wide, or wider than, the outer circumference 21 of the chamber entrance port 19.

As illustrated in FIGS. 4–5, 7–8 and 9A–9C, the waste containment chamber door 57 can be rotated via the linear actuating means 67, as well as the jam breaker bar 81, to open and close the door 57 (i.e., to seal or unseal the door 57). More specifically, the waste containment chamber door 57 can be secured, so as to seal the chamber entrance port 19, by rotating the door 57 sufficiently to cause engagement of the pivoting lugs 63 with receptor blocks 25 attached to the top end 7 of frame 5, and unlocked by rotating the door 57 so as to disengage the pivoting lugs 63 from the receptor blocks 25.

Figure 7:
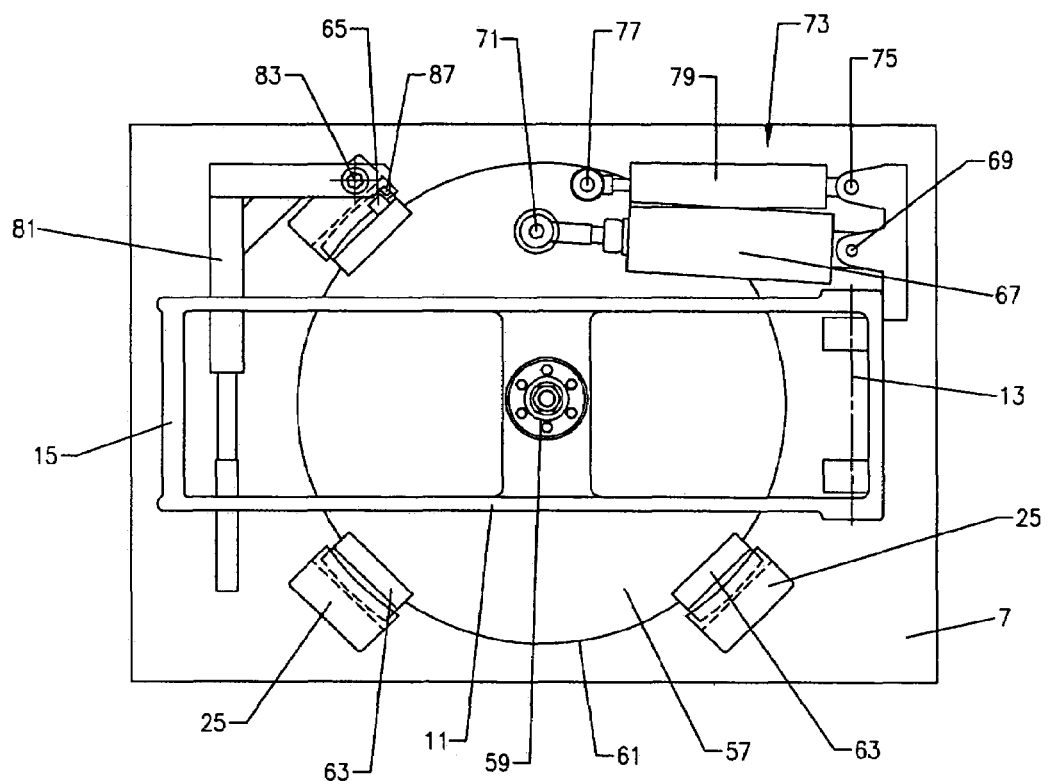
FIG. 7 is a plan view of the breech lock door assembly of the third embodiment of the present invention, in the locked position.
Figure 8:
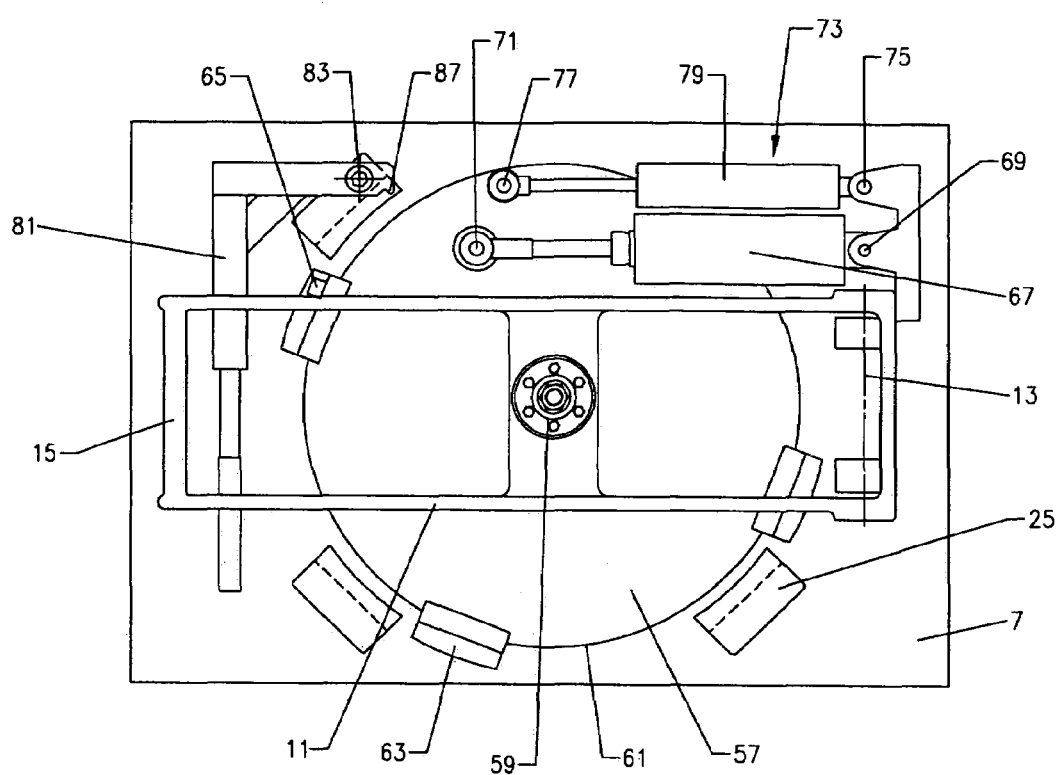
FIG. 8 is a plan view of the breech lock door assembly of the third embodiment of the present invention, in the unlocked position.
Figure 9A:
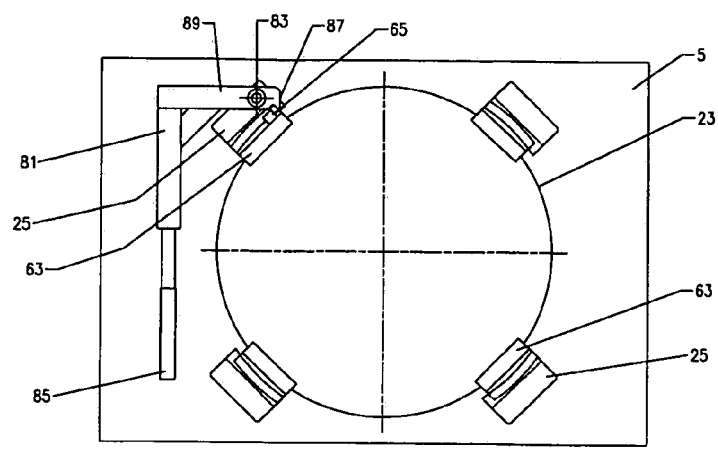
FIG. 9A is a simplified plan view of the breech lock door assembly of the third embodiment of the present invention, illustrating the jam breaker bar in the stowed position.
Figure 9B:
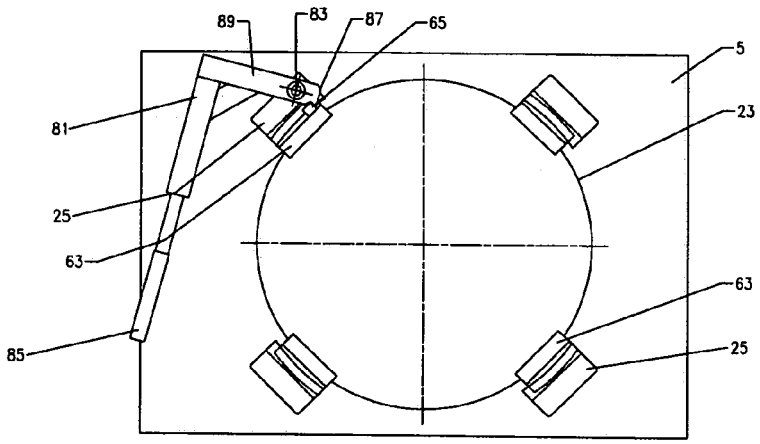
FIG. 9B is a simplified plan view of the breech lock door assembly of the third embodiment of the present invention, illustrating the jam breaker bar engaging the release block before the waste containment chamber door has begun to rotate (i.e., before the waste containment chamber door has begun to unlock).
Figure 9C:
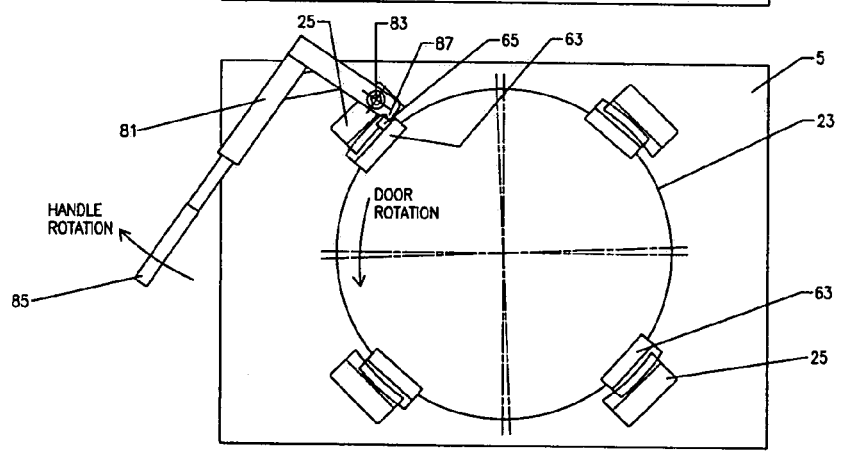
FIG. 9C is a simplified plan view of the breech lock door assembly of the third embodiment of the present invention, illustrating the jam breaker bar engaging the release block while the waste containment chamber door is rotating (i.e., while the waste containment chamber door is unlocking).

In standard operation, a linear actuating means 67, such as a hydraulic or pneumatic cylinder, is used to rotate the waste containment chamber door 57 to an unsealed position. In particular, as shown in FIGS. 7 and 8, a first end 69 of the linear actuating means 67 is fixably attached to the hinge arm assembly 11, and a second end 71 of the linear actuating means 67 is movably attached to the waste containment chamber door 57, such that linear force can be exerted upon the door 57 so as to rotate and disengage the pivoting lugs 63 from the receptor blocks 25.

In the event that melted plastic waste causes jamming of the waste containment chamber door 57, the linear actuating means 67 may be unable to exert sufficient pressure to unseal the door. In such case, a user may utilize the jam breaker bar 81, having a first end 85 defining a handle, a midsection 89 defining a pivot point adjacent the first end 85, and a second end 87 defining a release block interaction point adjacent the midsection 89, as illustrated in FIGS. 7–9C, to exert additional rotational pressure upon the waste containment chamber door 57. Essentially, torque is applied by the second end 87 of the jam breaker bar 81 through pivoting means 83 to the release block 65 attached to pivoting lug 63 to force the pivoting lugs to disengage from the receptor blocks 25.

Occasionally, when unsealing (opening) the waste containment chamber door 57, pressure applied against the door 57 inside of the chamber 17 causes the door 57 to suddenly and forcefully open. This situation can be hazardous to the user, and potentially damaging to the processor. Thus, as shown in FIGS. 7 and 8, a waste containment chamber door damper means 73 is provided, consisting of a damper 79 having a first end 75 thereof fixably connected to the hinge arm assembly 11, and a second end 77 thereof movably connected to the waste containment chamber door 57. This damper 79 may be, for example, a gas-charged hydraulic cylinder which limits the speed of opening of the door 57.

As shown in FIGS. 1–6, a pneumatically driven waste compaction means is provided adjacent to the waste containment chamber 17, the pneumatically driven waste compaction means consisting of a pneumatic drive means 29 attached to the base 3, and a pneumatically driven ram 31 movably connected to the pneumatic drive means 29 capable of compressing/compacting plastic waste 2 located within said waste containment means 17. Further, one or more dampers 33 are provided between, and connected to, the pneumatically driven ram 31 and the base 3, so as to control the movement of the pneumatically driven ram 31 (i.e., to prevent sudden, potentially damaging, forceful movement thereof).

Figure 12:
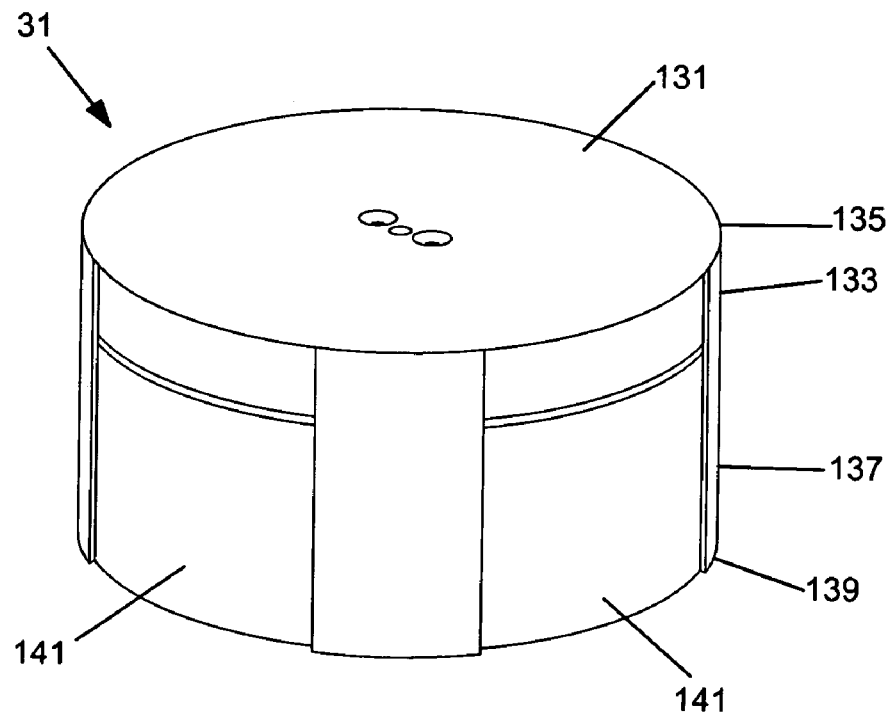
FIG. 12 is a perspective depiction of the pneumatically driven ram of the plastics waste processor of the present invention, illustrating the plastic shedding pneumatically driven ram of the twelfth embodiment.

In the conventional processors, during the waste compaction and heating process, melted plastic waste frequently wedges between the interior wall of the waste containment chamber 17 and the pneumatically driven ram 31, thus causing the pneumatically driven ram to become jammed in the waste containment chamber 17. This situation requires frequent maintenance of the processor, and inefficient operation. To solve this problem, the present invention provides a plastic-shedding pneumatically driven ram 31, as illustrated in FIG. 12, comprised of ram compaction face 131, a circumferential ram body portion 133 having a top edge 135 adjacent the ram compaction face 131, a midsection 137 adjacent the top edge 135, and a bottom edge 139 adjacent the midsection 137.

Relief portions 141 are formed into the midsection 137 of the circumferential ram body portion 133, and extend to the bottom edge 139 thereof. During processing, when plastic waste does extrude into the space between the pneumatically driven ram 31 and the interior wall of the waste containment chamber 17, instead of remaining in said space, the plastic waste falls down out of the space via the relief portions 141. Thus, the pneumatically driven ram 31 shown in FIG. 12 effectively sheds the plastic waste mentioned above, and the plastic waste is allowed to escape (drop down and out of) the processor, or into a catchment provided in the base of the processor.

Figure 13:
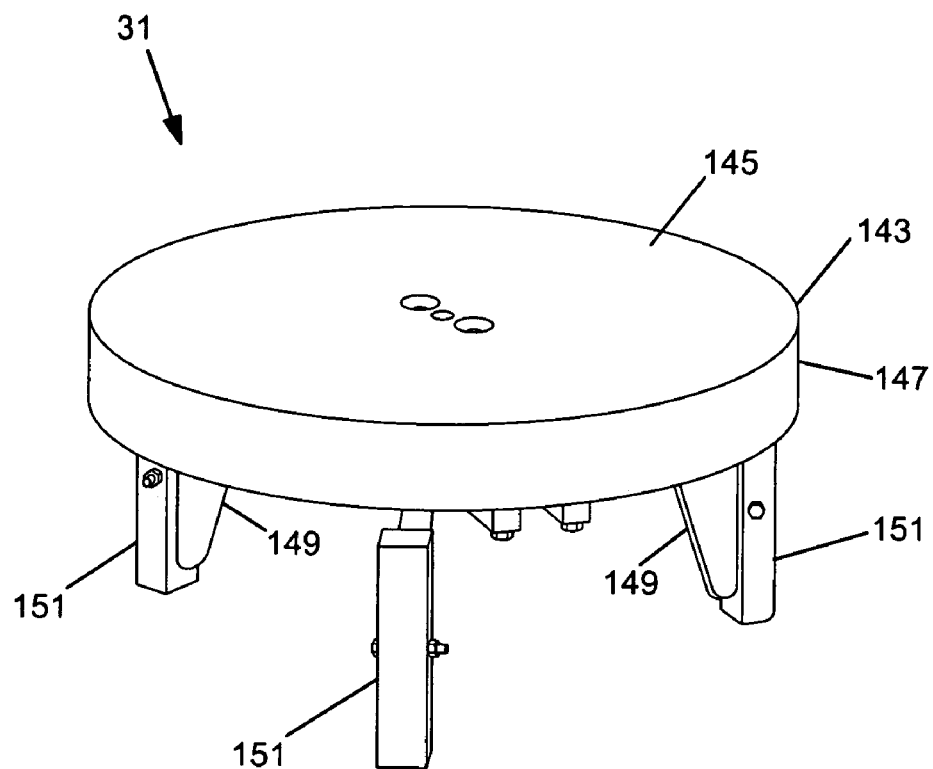
FIG. 13 is a perspective depiction of the pneumatically driven ram of the plastics waste processor of the present invention, illustrating the plastic shedding pneumatically driven ram of the thirteenth embodiment.

In an alternative embodiment, as illustrated in FIG. 13, a plastic-shedding pneumatically driven ram 31 is provided comprised of a ram compaction head 143 having a face 145, a circumferential portion 147 adjacent the face 145, and a base portion 149 adjacent the circumferential portion 147. Three or more guide runners 151 are provided integral with or attached to the base portion 149 of the ram compaction head 143, so as to maintain stability of the ram 31 within the waste containment chamber 17.

In the embodiment shown in FIG. 13, plastic waste extruded past the circumferential portion 147 of the ram compaction head 143 during compaction and processing of plastic waste is allowed to escape from the waste containment chamber 17 via spaces between the guide runners 151. Therefore, jamming of the ram 31 during processing is avoided.

Figure 14:
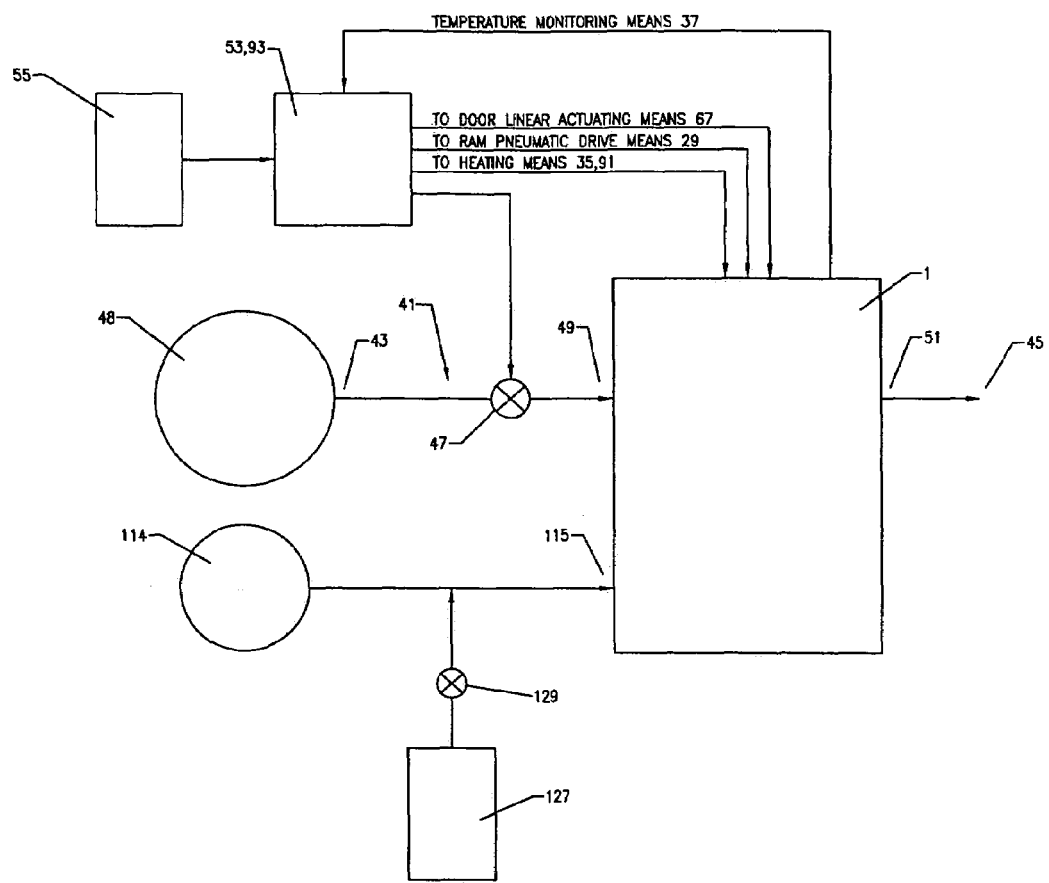
FIG. 14 is a schematic diagram of the plastic waste processor of the present invention, illustrating the cooling system of the fifth embodiment, the control system of the sixth embodiment, and the washdown system of the ninth and tenth embodiments.

During the compaction process, a waste containment chamber heating means 35, as shown in FIGS. 2–6, is used heat the plastics waste to a temperature at least high enough to melt the low-melting temperature plastics therein. The waste containment chamber heating means 35 may be, for example, electric resistance heaters, steam heating tubes or hot water heating tubes, and is provided integral with or adjacent to the breech lock door assembly 23 and the pneumatically driven ram 31. As illustrated in FIG. 14, a heating device controller 93 is provided to control the heating means 35 by monitoring the temperature of the heating means 35 through processor temperature monitoring means 37. The processor temperature monitoring means 37 may be comprised of one or more thermostats located adjacent to one or more components of the plastics waste processor 1.

At the completion of the compaction and heating of the plastics waste, the processor 1 must be cooled before the plastics waste slug can be removed. A cooling means is thus provided, in conductive connection with the processor temperature monitoring means 37 and adjacent to the waste containment chamber 17 and the pneumatically driven waste compaction means so as to be capable of cooling same. As shown in FIG. 14, the cooling means is comprised of a fluid circulation means 39 having a first end 43, a second end 45 and a flow control means 47, the fluid circulation means 41 being flowably connected to a pressurized fluid source 48. A fluid entrance port 49 is flowably connected to the first end 43 of the fluid circulation means 41, and a fluid exit port 51 is flowably connected to the second end 45 of the fluid circulation means 41.

The cooling means 39 may be a direct seawater cooling means or an indirect type cooling means, however, the direct seawater configuration is preferred. Further, the present inventors discovered that by using a cooling means 39 comprised of titanium tubing embedded in the waste containment chamber door 57 and the pneumatically driven ram 31, corrosion due to contact with seawater and oxidation thereof of the cooling means was greatly inhibited.

The processor is controlled by a user via a control means 53. The control means 53, as illustrated in FIG. 14, is conductively connected to one or more of the waste containment chamber heating means, the pneumatically driven waste compaction means, the door linear actuating means, the processor temperature monitoring means, and the cooling means. In addition, the control means 53 is conductively connected to the power source 55, and is capable of controlling power to the processor. The control means 53 may consist of an electromechanical device, but is preferably a computer controller having a user interface.

Figure 10:
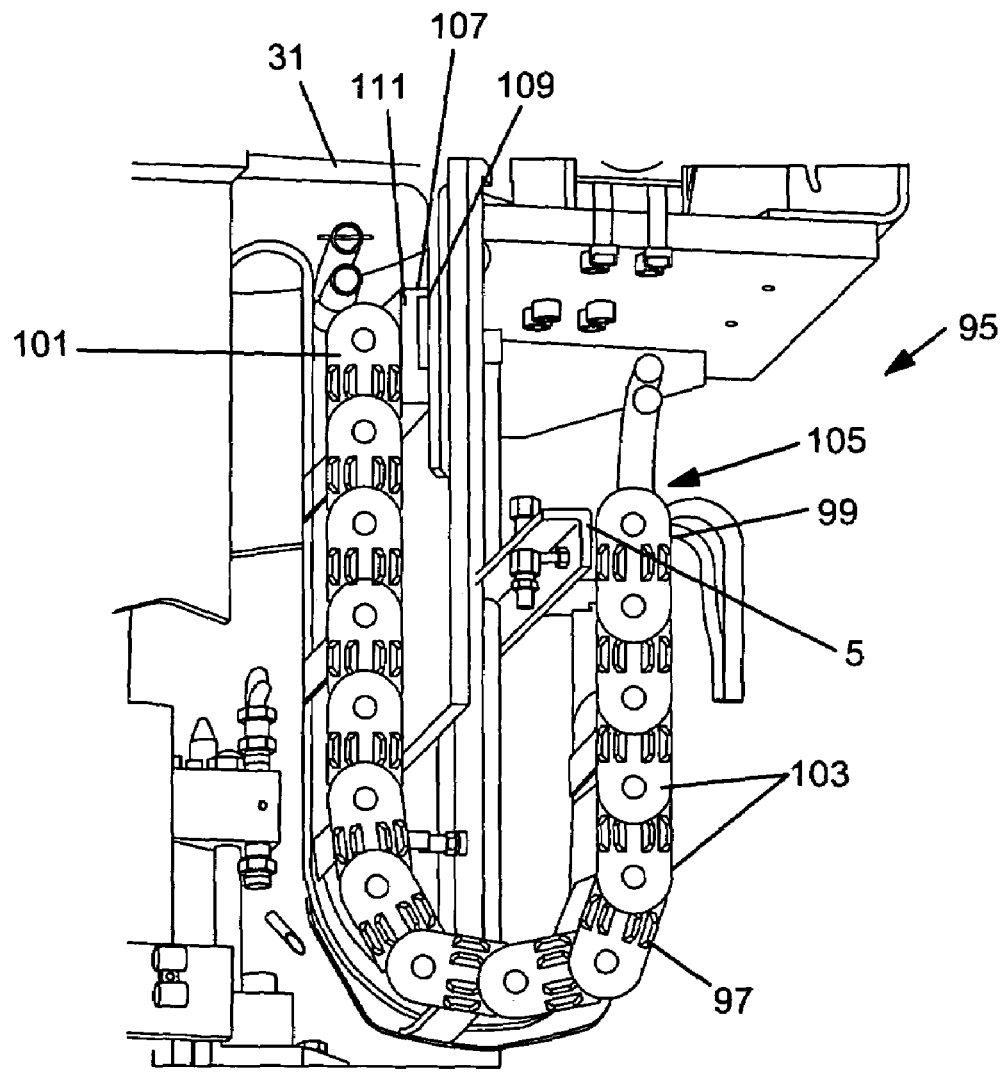
FIG. 10 is a partial cut away perspective view of the plastics waste processor of the present invention, illustrating the cable and hose management system of the seventh and eighth embodiments herein.

When plastics waste 2 is processed in the processor 1 of the present invention, the pneumatic drive means 29 moves the pneumatically driven ram 31 up and down, so as to compact the waste. Additionally, waste containment chamber heating means 35 heat the plastic waste within the waste containment chamber 17, so as to melt at least a portion thereof. Cables and hoses are used to connect the ram 31 and heating means 35 to the pneumatic drive means 29 and heating device controller 93. These cables and hoses, as illustrated in FIG. 10, move up and down with the pneumatically driven ram as the waste is processed. This can sometimes lead to tangling and damage to the cables and hoses, and difficulty in servicing and maintenance of the processor 1.

Thus, the present invention provides a cable and hose management system 95, as illustrated in FIG. 10, comprising one or more cable carriers 97 having a first end 99 and a second end 101, the first end 99 of the cable carrier 97 being affixed to the frame 5, and the second end 101 being affixed to the pneumatically driven ram 31. Each cable carrier 97 is comprised of a plurality of connected movable links 103, which have a hollow interior portion 105 for containment of cables and/or hoses, and for encompassing one or more waste containment chamber heating means cables, pneumatically driven waste compaction means cables and hoses, and processor temperature monitoring means cables.

As mentioned above, the second end 101 of cable and hose management system 95 is affixed to the pneumatic drive ram 31, which during processing reaches a very high temperature. Thus, there is the possibility that heat transfer from the ram 31 may damage the cable and hose management system 95. Thus, the cable and hose management system may further be provided with a thermal isolating means 107, as illustrated in FIG. 10, having a first end 109 affixed to the pneumatically driven ram 31, and second end 111 affixed to the second end 101 of the cable carrier 97, so as to thermally isolate the cable carrier 97 from heat generated by the pnuematically driven ram 31. The thermal isolator may be made of any thermally-insulating material, such as ceramic, glass, etc.

Much of the plastic waste processed in the processor is food, and otherwise, contaminated. Thus, the waste containment chamber 17, door 57 and ram 31, tend to become very dirty during use, which requires constant cleaning, and contributes to unreliability due to fouling of components. Conventionally, users were thus required to spend long periods of time cleaning the processor, sometimes needing to disassemble the processor to properly clean same. In order to solve this deficiency, the present inventors discovered that a washdown system 113, as illustrated in FIG. 11, could be built into the processor 1.

Figure 11:
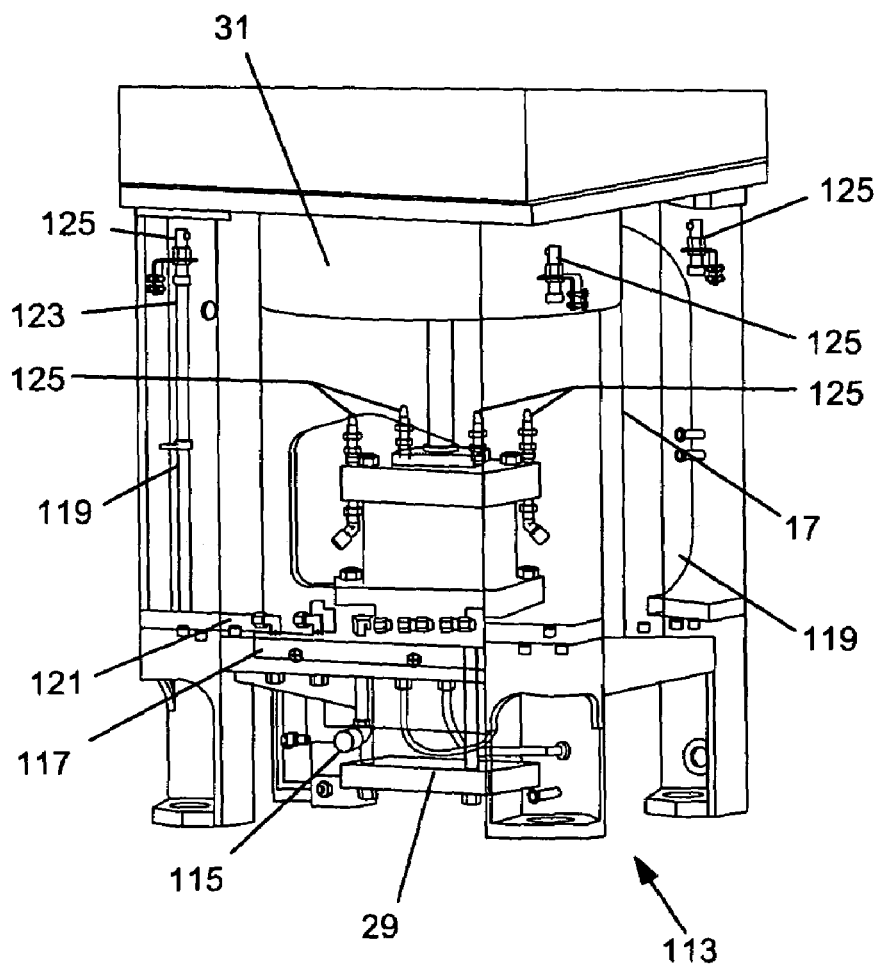
FIG. 11 is partial cut away perspective view of the plastic waste processor of the present invention, illustrating the washdown system of the ninth and tenth embodiments herein.

In particular, as illustrated in FIG. 11, a washdown system 113 is provided adjacent to the waste containment chamber 17 and pneumatically driven waste compaction means 29, for washing the processor of contaminants present in the plastic waste. The washdown system 113 has one or more fluid inlet ports 115, one or more fluid distribution manifolds 117 in flowable connection with one or more of the fluid inlet ports 115, one or more fluid supply tubes 119 having a first end 121 and a second end 123, the first end 121 of each fluid supply tube 119 being flowably connected to one or more of the fluid distribution manifolds 117.

Further, one or more spray nozzles 125 is provided adjacent to the waste containment chamber 17 and the pneumatically driven ram 31, the spray nozzles 125 being flowably connected to the second end 123 of a fluid supply tube 119. Generally, heated or unheated pressurized water is sprayed through the spray nozzles 125 to clean the chamber 17 and ram 31. However, in addition to simply pressurized water, detergent solution may be used to more effectively clean the processor 1.

In such an embodiment, a detergent solution holding tank 127, as illustrated in FIG. 14, is provided in flowable connection to one or more of the fluid inlet port 115, and a detergent solution flow control means 129 is provided in flowable connection with the detergent solution holding tank 127, such that flow of the detergent solution to one or more of the fluid distribution manifolds 117 from the holding tank 127 may be controlled by the control means 129. The detergent solution control means 129 may be any conventional means of flow control, but is preferably a programmable logic controller, a relay logic controller, or a mechanical logic controller.

The McGraw, et al. references fail to disclose the claimed jam breaker bar, the waste containment chamber door damper means, the pneumatically driven ram damping means, the washdown system, the plastic shedding ram designs, the titanium tubing of the cooling means, and the rotating breech lock mechanism wherein the door rotates to lock and unlock (versus McGraw's, which slides open and closed to lock and unlock).

DRAWING FIGURE ELEMENT NUMBERING GUIDE

1—plastics waste processor
2—waste plastic
3—base
5—frame
7—top end of frame
9—bottom end of frame
11—hinge arm assembly
13—hinge of hinge arm assembly
15—handle portion of hinge arm assembly
17—waste containment chamber
19—chamber entrance port
21—chamber entrance port outer circumference
23—breech-lock door assembly
25—receptor blocks
29—pneumatic drive means
31—pneumatically driven ram
33—dampers (positioned between the pneumatically driven ram and the base, and parallel to the pneumatically driven ram)

35—waste containment chamber heating means (integral with or adjacent to the breech lock door assembly and the pneumatically driven waste compaction means)
37—processor temperature monitoring means (comprising one or more thermostats located adjacent to one or more components of the plastics waste processor for monitoring a temperature of the processor during operation)
39—cooling means (in conductive connection with the processor temperature monitoring means and adjacent to the waste containment means and the pneumatically driven waste compaction means)
41—fluid circulation means (of the cooling means)
43—first end (of the cooling means)
45—second end (of the cooling means)
47—flow control means (of the cooling means)
48—pressurized fluid source
49—fluid entrance port (flowably connected to the first end of the fluid circulation means)
51—fluid exit port (flowably connected to the second end of the fluid circulation means)
53—user control means (conductively connected to one or more of the the waste containment chamber heating means, the pneumatically driven waste compaction means, and the processor temperature monitoring means)
55—power source (in conductive connection with the waste containment chamber heating means, the pneumatically driven waste compaction means, processor temperature monitoring means, and the cooling means)
57—waste containment chamber door
59—rotary bearing (disposed on the central axis of the waste containment chamber door, for rotatable engagement with the hinge arm)
61—outer circumference of the waste containment chamber door (equal to or larger than the chamber entrance port outer circumference)
63—two or more pivoting lugs attached to the outer circumference of the waste containment chamber door, so as to be capable of rotatable interaction with the receptor blocks
65—one or more release blocks (attached to the pivoting lugs)
67—linear actuating means
69—first end of the linear actuating means (fixably attached to the hinge)
71—second end of the linear actuating means (movably attached to the waste containment chamber door, and positioned so as to be able to rotatably move the waste containment chamber door)
73—waste containment chamber door damper means
75—first end of the waste containment chamber door damper means (fixably connected to the hinge)
77—second end of the waste containment door damper means (movably connected to the waste containment chamber door)
79—damper (between the first end and the second end of the waste containment chamber door damper means positioned so as to oppose rotary motion of the waste containment chamber door)
81—jam breaker bar (rotatably connected to one or more of the receptor blocks via a pivoting means)
83—pivot means of the jam breaker bar
85—first end of the jam breaker bar (defining a handle)
87—second end of the jam breaker bar (defining a release block interaction point)
89—midsection of the jam breaker bar (having a pivot point adjacent to the pivoting means)
93—heating device controller (in connection with the heating device).
95—cable and hose management system
97—cable carrier
99—first end of cable carrier (affixed to the frame)
101—second end of cable carrier (affixed to the pneumatically driven ram)
103—connected movable links (making up cable carrier)
105—hollow interior portion of connected movable links)
107—thermal isolating means of the cable and hose management system
109—first end of the thermal isolating means (affixed to the pneumatically driven ram)
111—second end of the thermal isolating means (affixed to the second end of the cable carrier)
113—washdown system (adjacent to the waste containment chamber and pneumatically driven waste compaction means)
114—source of pressurized wash water
115—fluid inlet ports of the washdown system
117—fluid distribution manifolds of the washdown system (in flowable connection with one or more of the fluid inlet ports)
119—fluid supply tubes of the washdown system
121—first end of the fluid supply tubes of the washdown system (connected to one or more of the fluid distribution manifolds)
123—second end of the fluid supply tubes of the washdown system
125—spray nozzles of the washdown system (adjacent to the waste containment chamber and the pneumatically driven ram, and flowably connected to the second end of a fluid supply tube)
127—detergent solution holding tank (flowably connected to one or more of the fluid inlet ports)
129—detergent solution flow control means (in flowable connection with the detergent solution holding tank)
131—a ram compaction face
133—circumferential ram body portion
135—top edge of circumferential ram body portion 133 (adjacent the ram compaction face)
137—midsection of circumferential ram body portion 133 (adjacent the top edge)
139—bottom edge of circumferential ram body portion 133 (adjacent the midsection 137)
141—relief portions (formed into the midsection 137 of the circumferential ram body portion 133, and extending to the bottom edge 139)
143—ram compaction head of FIG. 10
145—face of ram compaction head 143
147—circumferential portion of ram compaction head 143 (adjacent the face 145)
149—base portion of ram compaction head 143 (adjacent the circumferential portion 147)
151—guide runners (integral with or attached to the base portion of the ram compaction head 143)

What is claimed is:

1. A plastics waste processor comprising:
a base;
a frame having a top end, and a bottom end attached to said base;
a hinge arm assembly movably attached to the frame comprising a hinge fixed to said frame, and a handle portion attached to said hinge;
a waste containment chamber attached to said frame, said waste containment chamber comprising a waste chamber having a chamber entrance port therein, said chamber entrance port defining a chamber entrance port outer circumference;

a breech-lock door assembly rotatably attached to said hinge arm and adjacent to said chamber entrance port, said breech door lock assembly comprising:

(i) a waste containment chamber door adjacent to and in rotatable communication with the chamber entrance port, and attached to the handle portion of the hinge arm assembly, said waste containment chamber door having:
   (a) a rotary bearing disposed on a central axis, for rotatable engagement with the hinge arm;
   (b) an outer circumference equal to or larger than the chamber entrance port outer circumference;
   (c) two or more pivoting lugs attached to the outer circumference of the waste containment chamber door, so as to be capable of rotatable interaction with receptor blocks; and
   (d) one or more release blocks attached to said pivoting lugs;

(ii) a linear actuating means having a first end fixably attached to the hinge and a second end movably attached to the waste containment chamber door, and positioned so as to be able to rotatably move the waste containment chamber door; and (iii) a waste containment chamber door damper means having a first end, a second end, and a damper there between, the first end of the waste containment chamber door damper means fixably connected to the hinge, and the second end of the waste containment chamber door damper means movably connected to the waste containment chamber door, the damper means positioned so as to oppose rotary motion of the waste containment chamber door;

two or more of said receptor blocks affixed to the frame, and positioned adjacent to the outer circumference of the waste containment chamber entrance port;

a pneumatically driven waste compaction means interactively adjacent to said waste containment chamber, said pneumatically driven waste compaction means comprising:
   (i) a pneumatic drive means attached to said base;
   (ii) a pneumatically driven ram in movable connection with said pneumatic drive means, so as to be capable of compressing/compacting waste located within said waste containment chamber; and
(iii) one or more dampers positioned between the pneumatically driven ram and the base, and parallel to the pneumatically driven ram;

a waste containment chamber heating means integral with the breech lock door assembly and the pneumatically driven waste compaction means;

a processor temperature monitoring means comprising one or more thermostats located adjacent to one or more components of the plastics waste processor for monitoring a temperature of the processor during operation;

a cooling means in conductive connection with said processor temperature monitoring means and integral with the breech lock door assembly and the pneumatically driven waste compaction means so as to be capable of cooling same, said cooling means comprising a fluid circulation means having a first end, a second end and a flow control means, said fluid circulation means flowably connected to a pressurized fluid source, a fluid entrance port flowably connected to the first end of the fluid circulation means, and a fluid exit port flowably connected to the second end of the fluid circulation means; and a user control means conductively connected to one or more of the the waste containment chamber heating means, the pneumatically driven waste compaction means, and the processor temperature monitoring means.

2. The plastics waste processor of claim 1, further comprising:

a power source in conductive connection with the waste containment chamber heating means, the pneumatically driven waste compaction means, processor temperature monitoring means, and the cooling means.

3. The plastics waste processor of claim 1, wherein said breech lock door assembly is further comprised of:

a jam breaker bar rotatably connected to one or more of said receptor blocks via a pivoting means, so as to be capable of forcible interaction with one or more of said release blocks, said jam breaker bar having a first end defining a handle, a second end defining a release block interaction point, and a midsection having a a pivot point adjacent to the pivoting means;

wherein said jam breaker bar pivots around the pivoting means to exert pressure upon the release block of the waste containment chamber door assembly, so as to cause waste containment chamber door to rotate around the central axis thereof.

4. The plastics waste processor of claim 1, wherein said waste containment chamber heating means comprises:

a heating device selected from the group consisting of electric resistance heaters, steam heating tubes or hot water heating tubes; and a heating device controller in connection with the heating device.

5. The plastics waste processor of claim 1, wherein the cooling means is a direct seawater cooling means, and said fluid circulation means is comprised of titanium tubing embedded in the waste containment chamber door and the pneumatically driven ram.

6. The plastics waste processor of claim 1, wherein the control means having a comprises a computer controller and a user interface.

7. The plastics waste processor of claim 1, further comprising:

a cable and hose management system comprising one or more cable carriers having a first end and a second end, the first end of the cable carrier being affixed to the frame and the second end being affixed to the pneumatically driven ram, wherein each cable carrier is comprised of a plurality of connected movable links having a hollow interior portion for containment of cables and/or hoses for encompassing one or more of waste containment chamber heating means cables, pneumatically driven waste compaction means cables and hoses, and processor temperature monitoring means cables.

8. The plastic waste processor of claim 7, wherein the cable and hose management system further comprises a thermal isolating means having a first end affixed to the pneumatically driven ram and second end affixed to the second end of the cable carrier, so as to thermally isolate the cable carrier from heat generated by the pnuematically driven ram.

9. The plastics waste processor of claim 1, further comprising a washdown system adjacent to the waste containment chamber and pneumatically driven waste compaction means, said washdown system comprising:
- one or more fluid inlet ports;
- one or more fluid distribution manifolds in flowable connection with one or more of the fluid inlet ports;
- one or more fluid supply tubes having a first end and a second end, the first end of each fluid supply tube flowably connected to one or more of the fluid distribution manifolds;
- one or more spray nozzles adjacent to the waste containment chamber and the pneumatically driven ram, and flowably connected to the second end of a fluid supply tube.

10. The plastics waste processor of claim 9, wherein the washdown system further comprises:
- one or more detergent solution holding tanks flowably connected to one or more of the fluid inlet ports; and
- a detergent solution flow control means in flowable connection with the detergent solution holding tank,
- wherein flow of the detergent solution to one or more of the fluid distribution manifolds from the holding tank may be controlled by the control means.

11. The plastics waste processor of claim 10, wherein the detergent solution control means is selected from the group consisting of a programmable logic controller, a relay logic controller, or a mechanical logic controller.

12. The plastics waste processor of claim 1, wherein the pneumatically driven ram comprises:
- a ram compaction face;
- a circumferential ram body portion having a top edge adjacent the ram compaction face, a midsection adjacent the top edge, and a bottom edge adjacent the midsection;
- relief portions formed into the midsection of the circumferential ram body portion, and extending to the bottom edge thereof,
- wherein plastic waste extruded past the top edge of the circumferential ram body portion during compaction and processing of plastic waste is allowed to escape from the waste containment chamber via the relief portions.

13. The plastics waste processor of claim 1, wherein the pneumatically driven ram comprises:
- a ram compaction head having a face, a circumferential portion adjacent the face, and a base portion portion adjacent the circumferential portion; and
- three or more guide runners integral with or attached to the base portion of the ram compaction head
- wherein plastic waste extruded past the circumferential portion of the ram compaction head during compaction and processing of plastic waste is allowed to escape from the waste containment chamber via space between the guide runners.

* * * * *